United States Patent
Tamura et al.

(10) Patent No.: US 6,493,621 B2
(45) Date of Patent: Dec. 10, 2002

(54) OPERATOR REACTION DEPENDENT STAND-BY BRAKE TORQUE BUILD-UP RATE CONTROLLING SCHEME

(75) Inventors: Minoru Tamura, Yokohama (JP); Hideaki Inoue, Yokohama (JP); Takayuki Watanabe, Kanagawa (JP); Naoki Maruko, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/038,574

(22) Filed: Jan. 8, 2002

(65) Prior Publication Data

US 2002/0091478 A1 Jul. 11, 2002

(30) Foreign Application Priority Data

Jan. 9, 2001 (JP) .......................... 2001-001932

(51) Int. Cl.$^7$ .............................. G06F 7/00; G06F 17/00
(52) U.S. Cl. ......................... 701/70; 701/96; 180/168; 340/903; 340/436
(58) Field of Search ............................. 701/70, 96, 93, 701/301, 300; 180/168, 170, 175; 340/901, 903, 436, 425.5

(56) References Cited

U.S. PATENT DOCUMENTS

| | | | | |
|---|---|---|---|---|
| 5,594,645 A | * | 1/1997 | Nishimura et al. | 180/169 |
| 6,131,063 A | * | 10/2000 | Seki et al. | 340/575 |
| 6,229,438 B1 | * | 5/2001 | Kutlucinar et al. | 340/438 |
| 6,233,516 B1 | * | 5/2001 | Egawa | 180/167 |
| 6,278,360 B1 | * | 8/2001 | Yanagi | 180/281 |
| 6,293,361 B1 | | 9/2001 | Mueller | 180/272 |
| 6,342,832 B1 | * | 1/2002 | Fuchs et al. | 340/436 |

FOREIGN PATENT DOCUMENTS

| | | |
|---|---|---|
| JP | 5-112158 | 5/1993 |
| JP | 7-144588 | 6/1995 |
| JP | 8-80822 | 3/1996 |
| JP | 10-24818 | 1/1998 |
| JP | 10-59150 | 3/1998 |
| JP | 11-5528 | 1/1999 |
| JP | 11-175898 | 7/1999 |
| JP | 11-255087 | 9/1999 |
| JP | 11-286264 | 10/1999 |
| JP | 2000-247161 | 8/2000 |
| JP | 2001-233189 | 8/2001 |

OTHER PUBLICATIONS

2001/0004028—Sato et al—vehicle deceleration control apparatus and control method for the same—Jan. 21, 2001.*

* cited by examiner

*Primary Examiner*—William A. Cuchlinski, Jr.
*Assistant Examiner*—Olga Hernandez
(74) *Attorney, Agent, or Firm*—Foley & Lardner

(57) ABSTRACT

The present invention pertains a controlling scheme for build-up or variation rate at which brake pressure increases till completion of pressure build-up for stand-by brake torque. Stand-by brake torque control begins with recognition of emergency or occurrence of operator reaction or quick release of accelerator. During initial stage of the stand-by brake control, brake pressure increases till completion of pressure build-up for stand-by brake torque before vehicle operator depresses a brake pedal. Build-up or variation rate at which brake pressure increases till completion of pressure build-up for stand-by brake torque is determined in response to time left before the operator depresses the brake pedal. Period of time left before the operator depresses the brake pedal varies with differing events that have initiated the stand-by brake torque control.

11 Claims, 7 Drawing Sheets

OPERATOR REACTION DEPENDENT STAND-BY BRAKE TORQUE BUILD-UP RATE CONTROLLING SCHEME

BACKGROUND OF THE INVENTION

The present invention relates to a method and a system for controlling a build-up rate at which brake pressure increases till completion of pressure build-up for stand-by brake torque applied to an automotive vehicle during stand-by brake torque control under a condition of approaching or following an obstacle preceding the vehicle. The term "obstacle" is used herein to mean a stationary or moving object within the path of the vehicle, for example, vehicles, pedestrians, etc. The term "stand-by brake torque" is used herein to mean a brake torque, i.e., a negative torque, applied to a vehicle in anticipation of operator braking action or when operator braking action is imminent under a condition of approaching or following an obstacle preceding the vehicle. The term "operator braking action" is used herein to mean vehicle operator or driver action to operate a brake pedal with intention to lower traveling speed of a vehicle.

JP-A 7-144588 discloses a system whereby traveling speed and deceleration of an obstacle preceding a host vehicle are determined using a Doppler sensor and a vehicle speed sensor, which are on the vehicle, and a desired distance from the obstacle is determined. In this system, a vehicle operator is warned and an automatic braking action is initiated if the distance from the obstacle becomes less than the desired distance.

Various control schemes for braking of a vehicle are known in he art. One such example, as disclosed in JP-A 11-175898, is substituting the output of a millimeter wave radar for the output of a laser radar if the latter fails, and setting a different set of thresholds upon comparing to the output of the millimeter wave radar from an initial set of thresholds for comparison to the output of the laser radar. Another example, as disclosed in JP-A 8-80822 or JP-A 10-59150, is initiating partial activation of a vehicle braking system when the time rate of change of throttle angle upon operator releasing the accelerator pedal exceeds a predetermined level.

In the above-mentioned examples, comparing thresholds to the output of the radar or comparing the predetermined value to the time rate of change of throttle angle to initiate braking action. Various other measures to determination of the initiation of braking action are known in the art. One such example is proposed by the assignee of the present invention and described in IP-A 10-24818. According to this proposal, an axial thrust applied to a steering shaft from a steering wheel is monitored for comparison to a threshold in anticipation of axial load applied to the steering wheel by an operator during his/her leg motion to step on a brake pedal. Comparing the monitored axial thrust to the threshold is used to determine the level of emergency of braking. Another example is monitoring the strength of operator grasping a steering wheel to determine the level of emergency as disclosed in JP-A 11-286264. Still another example is proposed by the assignee of the present invention and described in JP-A 11-5528 or JP-A 11-255087. This example is monitoring the strength of operator stepping on a footrest to determine the level of emergency. Other example is proposed by the assignee of the present invention and described in JP-A 5-112158.

The conventional systems are satisfactory to some extent, but a need still remains for developing stand-by brake torque control in a direction to provide enhanced response of a brake system to operator action for braking without impairing operator ride feel.

SUMMARY OF THE INVENTION

An object of the present invention is to provide a system and a method for stand-by brake torque control, which provides enhanced response of a brake system to operator depression of a brake pedal without impairing operator ride feel.

According to one aspect of the present invention, there is provided a system for stand-by brake torque control wherein brake pressure increases till completion of pressure build-up for stand-by brake torque applied to an automotive vehicle under a condition of approaching or following an obstacle preceding the vehicle, the system comprising:

an obstacle recognition system detecting a distance to the obstacle preceding the vehicle;

a vehicle speed sensor detecting traveling speed of the vehicle;

an accelerator operable by an operator of the vehicle;

an accelerator sensor detecting operator demand for vehicle acceleration from motion of the accelerator;

an operator reaction responsive sensor detecting reaction by the operator; and a controller programmed to perform stand-by brake torque control before operator action for braking, to select one of predetermined different emergency levels in response to at least one of the detected distance the detected traveling speed, the detected operator demand, and the detected reaction, and to determine one of various variation rates in response to the selected one emergency level for initiating the stand-by brake torque control by increasing brake pressure at the determined one variation rate till completion of pressure build-up for stand-by brake torque applied to the vehicle.

According to another aspect of the present invention, there is provided a method for stand-by brake torque control wherein brake pressure increases till completion of pressure build-up for stand-by brake torque applied to an automotive vehicle under a condition of approaching or following an obstacle preceding the vehicle, the vehicle having an accelerator and a brake pedal, the method comprising:

initiating stand-by brake torque control upon determination of one of events that include recognition of emergency, operator reaction, and quick release of the accelerator;

determining a variation rate at which brake pressure increases till completion of pressure build-up for stand-by brake torque applied to the vehicle in response to time left before the vehicle operator depresses the brake pedal after determining the one event; and increasing brake pressure at the determined variation rate till completion of pressure build-up for stand-by brake torque before the vehicle operator depresses the brake pedal.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENTS

Figure 1:
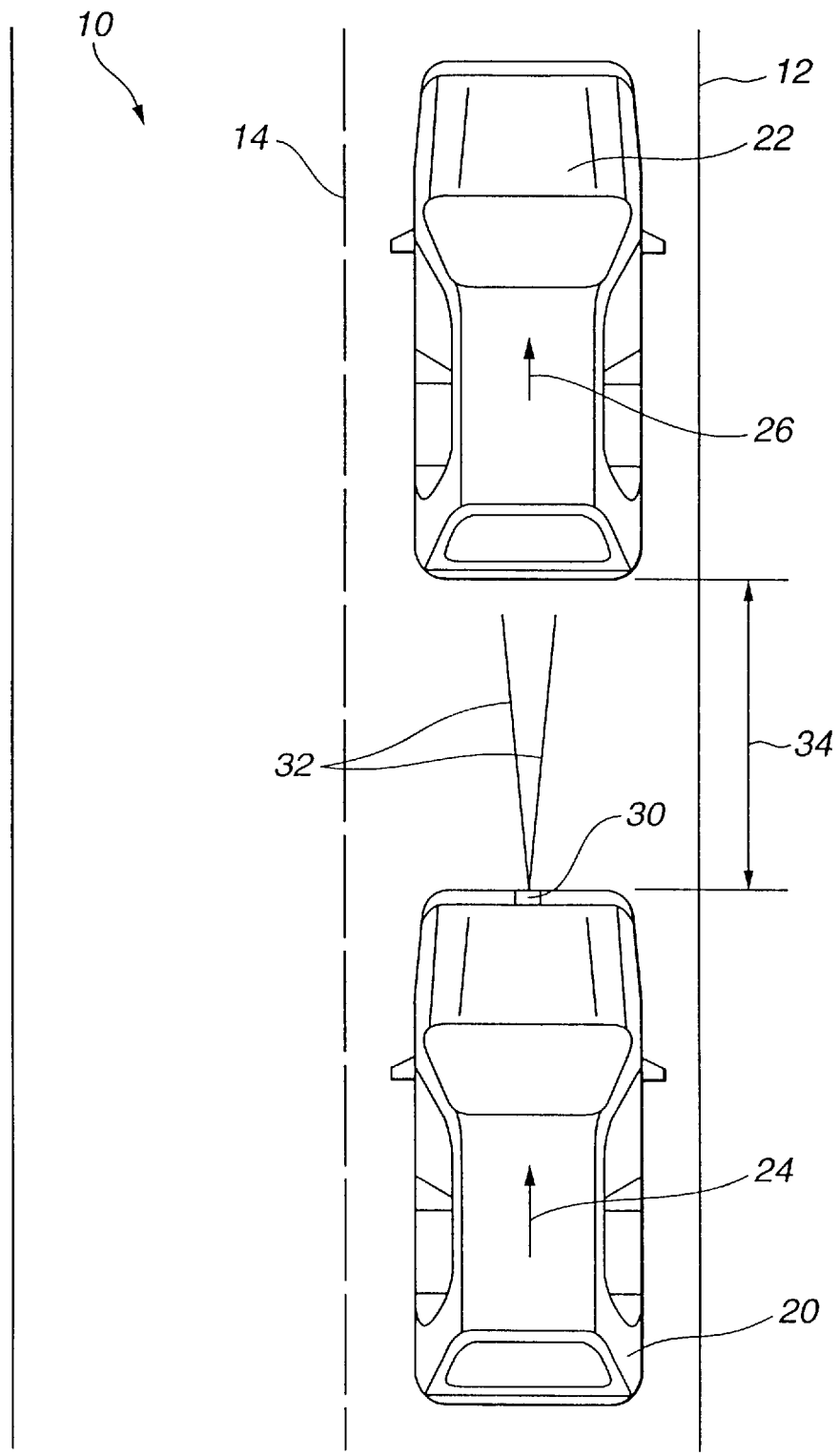
FIG. 1 is a plan view of an obstacle avoidance situation on a straightway.
Figure 2:
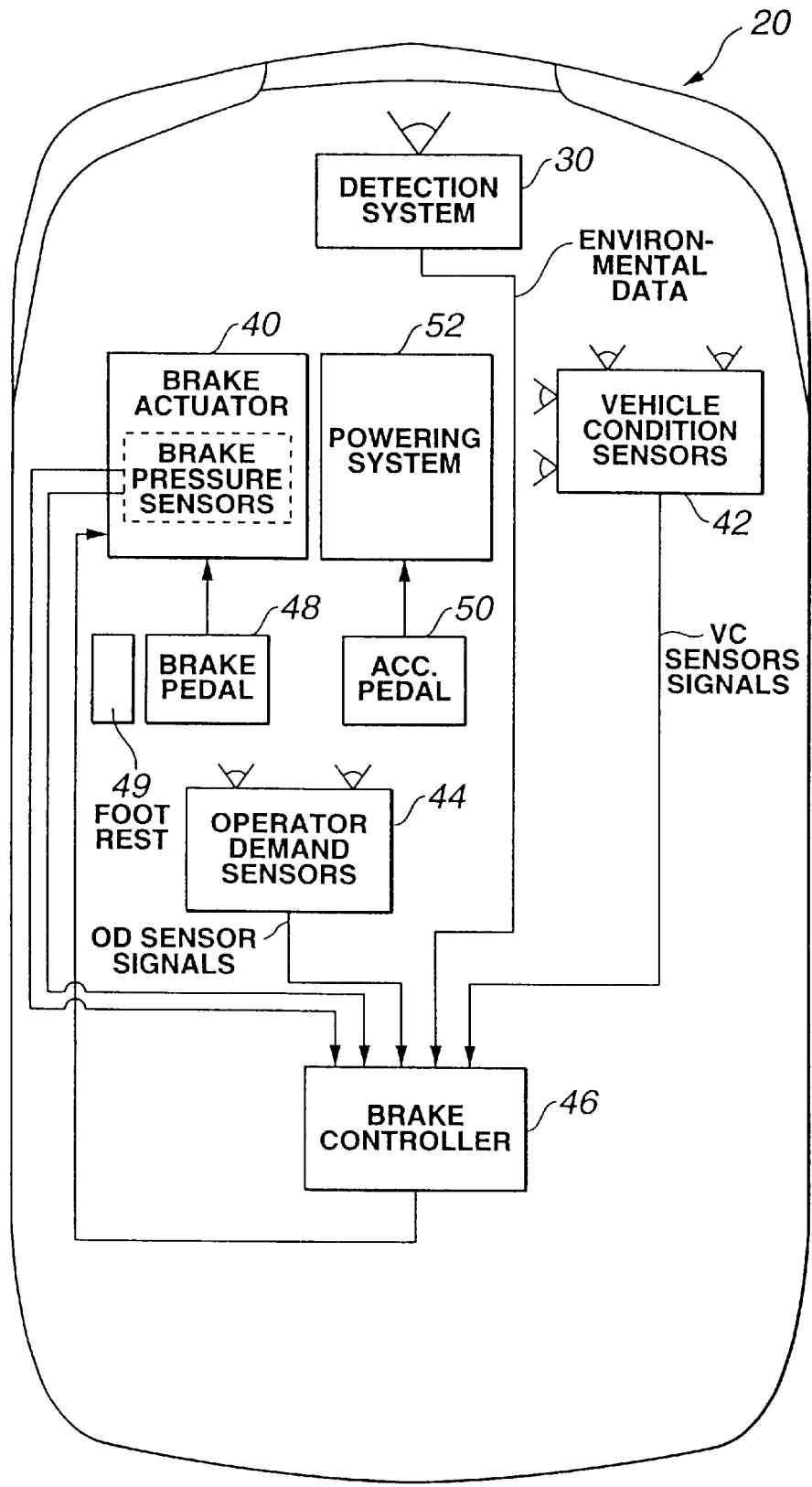
FIG. 2 is a schematic block diagram showing the arrangement of one representative implementation of a system for controlling stand-by brake torque applied to an automotive vehicle under a condition of approaching or following an obstacle preceding the vehicle.

FIG. 1 shows a typical situation on a straightway 10 having an edge 12 and a centerline 14, in which a fast moving automotive vehicle 20 is approaching an obstacle, in the form of a slow moving vehicle 22, from behind. Vehicle 20 is moving at a velocity in the direction of an arrow 24, and vehicle 22 at a velocity in the direction of an arrow 26. In FIG. 1, arrows 24 and 26 are vectors so that their lengths represent the magnitude of the velocities. In the front portion of vehicle 20, an obstacle detection system 30, shown schematically, scans roadway 10 within an angular field 32. In this case, vehicle 22 in front is located inside angular field 32 and vehicle 20 is spaced at a distance 34. On the basis of evaluation of the environmental data from detection system 30, vehicle 20 will recognize the illustrated situation as a situation in which there is a need for operator braking action to reduce the vehicle speed. In this situation, it is required for the vehicle operator to release the accelerator prior to braking action. In a preferred embodiment, control logic is employed to determine that operator braking action is imminent in response to a reduction in accelerator angle in the situation in which a need for operator braking action remains, and to apply stand-by brake torque upon determination that operator braking action is imminent. Application of stand-by brake torque is adapted for assist in vehicle operator braking action. In another embodiment, control logic may be employed to determine that operator braking action is imminent when speed of reduction in accelerator angle exceeds a threshold, FIG. 2 provides arrangement of one representative implementation of a system for controlling stand-by brake torque in vehicle 20. The system determines a command in the form of a brake signal for brake pressure to apply stand-by brake torque. The brake signal is applied to a brake actuator 40. For this purpose, environmental data furnished by detection system 30, vehicle condition (VC) sensors signals from vehicle condition (VC) sensors 42, and operator demand (OD) sensors signals from operator demand sensors 44 are supplied to a brake controller 46. OD sensors 44 include a sensor for detecting operator deceleration demand expressed through a brake pedal 48, a sensor for detecting operator body reaction by monitoring pressure imparted to a footrest 49 by vehicle operator, and a sensor for detecting operator power demand expressed through an accelerator or accelerator pedal 50. Operator power demand is applied to a powering system 52. In the embodiment, powering system 52 is a power train including an internal combustion engine, and a transmission. The engine has various engine speeds and engine torques. The transmission has various speed ratios between an input member driven by the engine and an output member drivingly coupled with at least one of wheels of vehicle 20. In a preferred embodiment, brake actuator 40 employs hydraulic fluid, such as brake oil, as working medium.

Figure 3:
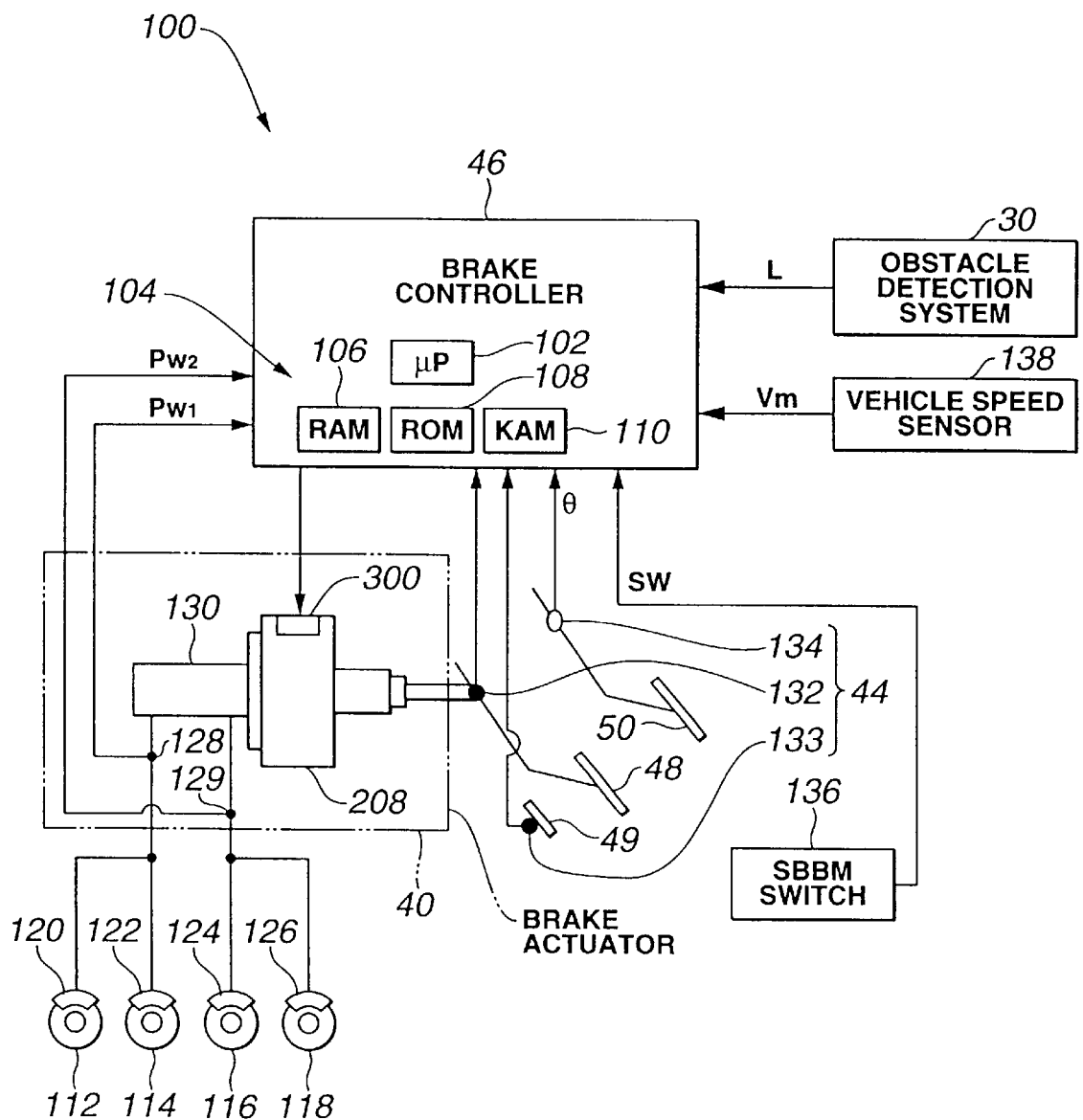
FIG. 3 is a block diagram illustrating a system and method for stand-by brake torque control, which provides stand-by brake torque applied to an automotive vehicle under a condition of approaching or following an obstacle preceding the vehicle.

Referring to FIG. 3, a block diagram illustrates an operation of a system or method for controlling stand-by brake torque applied to an automotive vehicle under a condition of approaching or following an obstacle preceding the vehicle. System 100 preferably includes a controller, such as brake controller 46. Brake controller 46 comprises a microprocessor-based controller associated with a microprocessor, represented by a reference numeral 102. Microprocessor 102 communicates with associated computer-readable storage medium 104. As will be appreciable by one of ordinary skill in the art, computer-readable storage medium 104 may include various devices for storing data representing instructions executable to control a braking system including brake actuator 40. For example, computer-readable storage medium 104 may include a random access memory (RAM) 106, a read-only memory (ROM) 108, and/or a keep-alive memory (KAM) 110. These functions may be carried out through any one of a number of known physical devices including EPROM, EEPROM, flash memory, and the like. The present invention is not limited to a particular type of computer-readable storage medium, examples of which are provided for convenience of description only.

Controller 46 also includes appropriate electronic circuitry, integrated circuits, and the like to effect control of the braking system. As such, controller 46 is used to effect control logic implemented in terms of software (instructions) and/or hardware components, depending upon the particular application. Details of control logic implemented by controller 46 are provided with reference to FIGS. 6 and 7.

Controller 46 monitors brake torque applied, as a stand-by brake torque to vehicle 20, and preferably receives inputs from brake actuator 40 indicative of present conditions of the brake actuator 40. For example, controller 46 may receive brake system pressure indicative of a hydraulic brake pressure for operating one or more braking devices, which may include any device that applies a negative torque to front wheels 112 and 114 and rear wheels 116 and 118. A braking device includes various types of friction brakes, such as disk brakes 120, 122, 124, and 126 or drum brakes. In FIG. 3, two pressure sensors, namely a first pressure sensor 128 and a second pressure sensor 129, are provided to generate brake pressure indicative output signals $P_{w1}$ and $P_{w2}$. Signal $P_{w1}$ is indicative of front hydraulic brake pressure delivered to friction brakes 120 and 122 for front wheels 112 and 114. Signal $P_{w2}$ is indicative of rear hydraulic brake pressure delivered to friction brakes 124 and 126 for rear wheels 116 and 118. In FIG. 3, brake actuator 40 includes a master brake cylinder 130, with a brake booster 208, and a brake pedal 48. First and second pressure sensors 128 and 129 are located to detect brake pressure within hydraulic fluid line interconnecting master brake cylinder 130 and friction brakes 120 and 122. Brake booster 208 in the embodiment will be described later in connection with FIG. 4.

Controller 46 receives inputs from operator demand sensors 44, which include a brake switch 132, a footrest pressure sensor 133, and an accelerator stroke (AC) sensor 134. The setting is such that brake switch 132 is turned off upon operator releasing brake pedal 48 or turned on upon operator depressing brake pedal 48. Footrest pressure sensor 133 detects the magnitude of pressure imparted to footrest 46 by operator and provides a footrest pressure signal FT when the magnitude of the detected pressure exceeds a predetermined value. AC sensor 134 detects angle θ of accelerator pedal 50 through measurement of its stroke. Controller 46 receives angle θ and determines operator power demand expressed through accelerator pedal 50. In the embodiment, AC sensor 134 constitutes a component of a system for determining the magnitude or degree of operator power demand.

In the embodiment shown in FIG. 3, controller 46 receives input SW from a stand-by brake torque control mode (SBBM) switch 136, which may be manually operated or automatically operated in view of circumstances around the vehicle 20. The setting is such that controller 46 performs operation in stand-by brake torque control mode upon selection of the mode by SBBM switch 136.

Controller 46 receives environmental data from obstacle detection system 30. In the embodiment shown in FIG. 3, obstacle detection system 30 includes a radar sensor in the form of conventional laser radar or millimeter wave (MMW) radar sensor mounted in a forward section of vehicle 20. The conventional laser radar sensor comprises such known elements as laser diodes, transmission and receiver lenses, infrared filters, and photodiodes, as is generally understood in the art to which this invention pertains. MMW radar typically comprises such known elements as an antenna, down converter, video processor, FMCW modulator and associated electronics, as is generally understood in the art to which this invention pertains. The radar sensor propagates a signal along the path of vehicle 20 and collects reflections of the signal from an obstacle in or near the path. Obstacle detection system 30 further comprises an analog-to-digital converter of any suitable conventional type for converting the radar sensor output signal to a digital form for processing in microprocessor 102 to determine a distance L between vehicle 20 and an obstacle preceding the vehicle or a range to the obstacle.

Controller 46 receives input from a vehicle speed sensor 138. Vehicle speed sensor 138 is provided to measure or detect speed of rotation of the transmission output member. The vehicle speed sensor output signal is converted to a digital form by a suitable conventional analog-to-digital converter for processing in microprocessor 102 to determine vehicle speed Vm of vehicle 20. Most current vehicles are provided with a microprocessor-based controller, such as, an engine controller or an automatic transmission controller, which processes input from a vehicle speed sensor to determine vehicle speed Vm. In such case, controller 46 may receive the determined vehicle speed from such controller.

In embodiments of the present invention, processor 102 of controller 46 effects processing input data to determine and applies a brake signal to brake booster 208.

Figure 4:
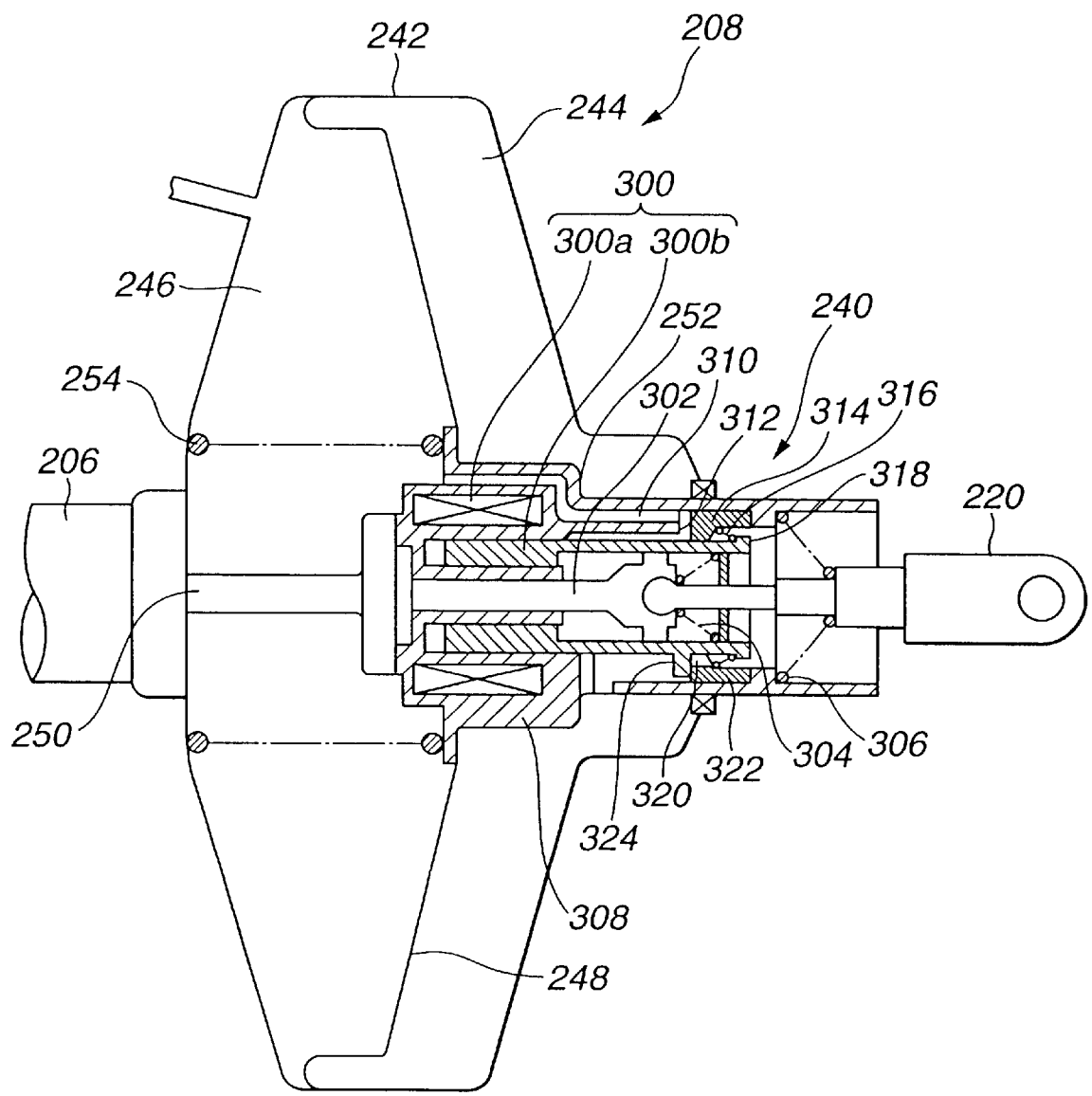
FIG. 4 is a schematic sectional view of a brake actuator.

Referring to FIG. 4, brake booster 208 includes an electro-magnetically operable control valve arrangement 240. Controller 46 provides braking command or signal to control valve arrangement 240 for adjustment of brake pressure to accomplish a target value of stand-by brake torque. Brake booster 208 comprises an essentially rotation symmetrical housing 242, in which a rear chamber 244 and a front chamber 246 are arranged and separated from each other by a movable wall 248. Control valve arrangement 240 is coupled with movable wall 248 for a common relative movement with respect to housing 242. The front end of rod-shaped actuation member 220, which is coupled with brake pedal 48, acts on control valve arrangement 240.

Within brake booster 208, a power output member 250 is arranged which bears against control valve arrangement 240. Power output member 250 is provided for activation of master brake cylinder 130.

Control valve arrangement 240 comprises an essentially tubular valve housing 252. The front end of valve housing 252 is coupled to movable wall 248. A return spring 254 arranged within brake booster 208 resiliently biases the control valve arrangement 240 in a rearward direction. Within valve housing 252, an electromagnetic actuator 300 is arranged which includes a solenoid coil 300a and a plunger 300b. Arranged within plunger 300b is an operating rod 302. The front end of operating rod 302 bears against power output member 250. A return spring 304 located within plunger 300b has one end bearing against a retainer (no numeral) fixedly connected to plunger 300b and opposite end bearing against the rear end of operating rod 302. The front ball end of rod-shaped actuator 220 is fixedly inserted into socket recessed inwardly from the rear end of operating rod 302. A return spring 306 located within valve housing 308 has one end bearing against a shoulder of valve housing 308 and opposite end bearing against a shoulder of rod-shaped actuator 220.

Valve housing 308 is formed with a passage 310 through which fluid communication between rear and front chambers 244 and 246 is established. The front end of passage 310 is always open to front chamber 246, while the rear end of passage 310 is located within a valve seat 312. Valve seat 312 is located within an annular space defined between plunger 300b and valve housing 308 and faces a valve member 314 that forms an upper portion of a slide. The slide is located between plunger 300b and valve housing 308. A return spring 316 has one end bearing against an integral abutment 318 of plunger 300b and opposite end bearing against the slide. An air admission port 320 is formed through a lower portion of the slide. This lower portion of the slide serves as a valve seat 322. Port 320 is provided to admit ambient air into rear chamber 244. Valve seat 322 formed with port 320 faces a valve member 324 integral with plunger 300b. Valve seat 312 and valve member 314 cooperate with each other to form an interruption or vacuum valve. Valve seat 322 and valve member 324 cooperate with each other to form an ambient air admission valve.

In the rest position shown in FIG. 4 with the vacuum source disconnected, atmospheric pressure prevails in both chambers 244 and 246. With the vacuum source connected, i.e., with the engine running, a vacuum builds up in front chamber 246 so that movable wall 248 together with the control valve arrangement 240 is slightly displaced in a forward direction. Accordingly, a new pressure balance is achieved between two chambers 244 and 246. From this position, a lost travel free activation of the brake booster 208 is ensured.

Under a normal brake actuation by the vehicle operator, the brake booster 208 operates in a usual manner by interrupting the connection between two chambers 244 and 246 via the interruption valve (312, 314) and admitting ambient air into rear chamber 244 via the ambient air admission valve (324, 322).

Electromagnetic actuator 300 can actuate control valve arrangement 240. For this purpose, current through solenoid 300a is regulated in response to the command furnished by brake controller 46. This command causes a displacement of control valve arrangement 240 so that ambient air can flow into rear chamber 244.

Figure 5:
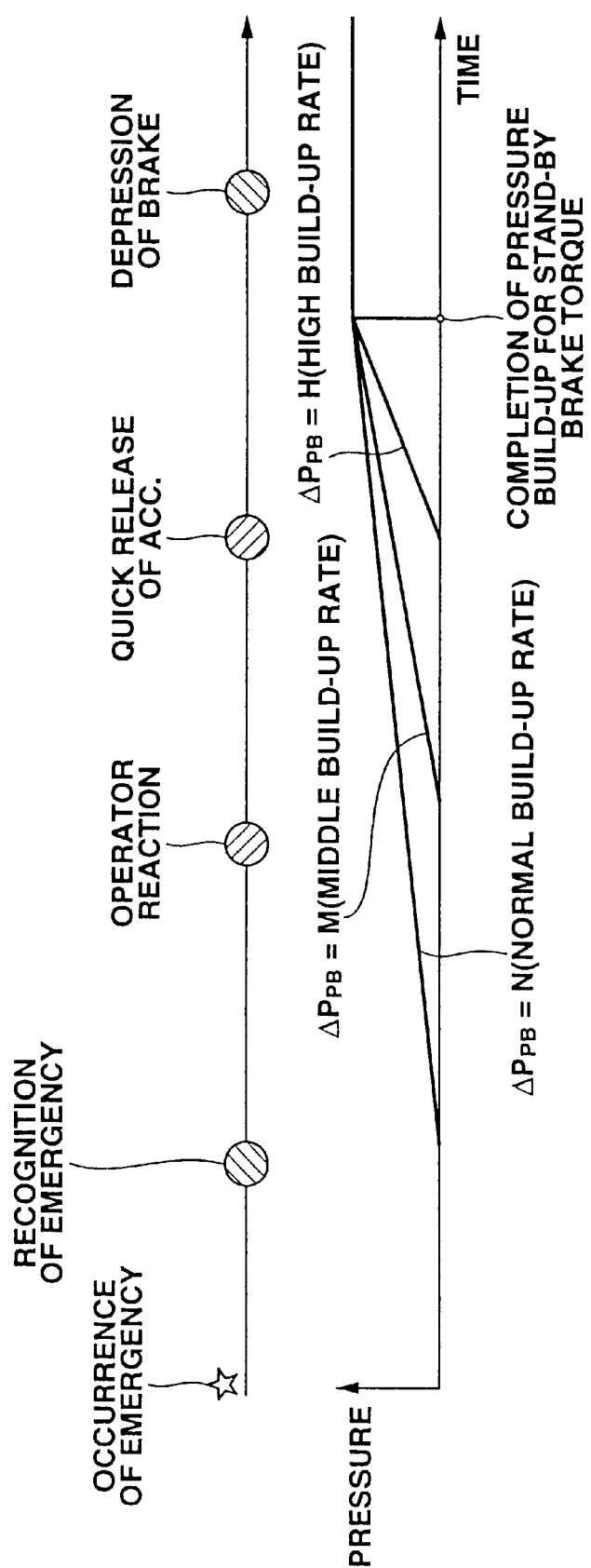
FIG. 5 is a timing diagram illustrating a control scheme for controlling a build-up or variation rate at which brake pressure increases till completion of pressure build-up for stand-by brake torque.

FIG. 5 illustrates a controlling scheme for build-up or variation rate $\Delta P_{PB}$ at which brake pressure increases till completion of pressure build-up for stand-by brake torque. Stand-by brake torque control begins with recognition of emergency or occurrence of operator reaction or quick release of accelerator for initiating pressure build-up for stand-by brake torque before vehicle operator depresses a brake pedal. Build-up or variation rate $\Delta P_{PB}$ at which brake pressure increases till completion of pressure build-up for stand-by brake torque is determined in response to time left before the operator depresses the brake pedal. Period of time left before the operator depresses the brake pedal varies with differing events that have initiated the stand-by brake torque control. If recognition of emergency has initiated the stand-by brake torque control, the variation rate $\Delta P_{PB}$ is set at a value N for normal-level emergency. If the occurrence of operator reaction has initiated the stand-by brake torque control, the variation rate $\Delta P_{PB}$ is set at a value M for middle-level emergency. If the quick release of accelerator pedal has initiated the stand-by brake torque control, the variation rate $\Delta P_{PB}$ is set at a value H for highest-level emergency. The stand-by brake torque control continues for a predetermined period of time, for example, 1 second. This period of time has been determined taking into the average of time required from the moment of one of the above-mentioned three events to the moment when the vehicle operator would depress the brake pedal.

Figure 6:
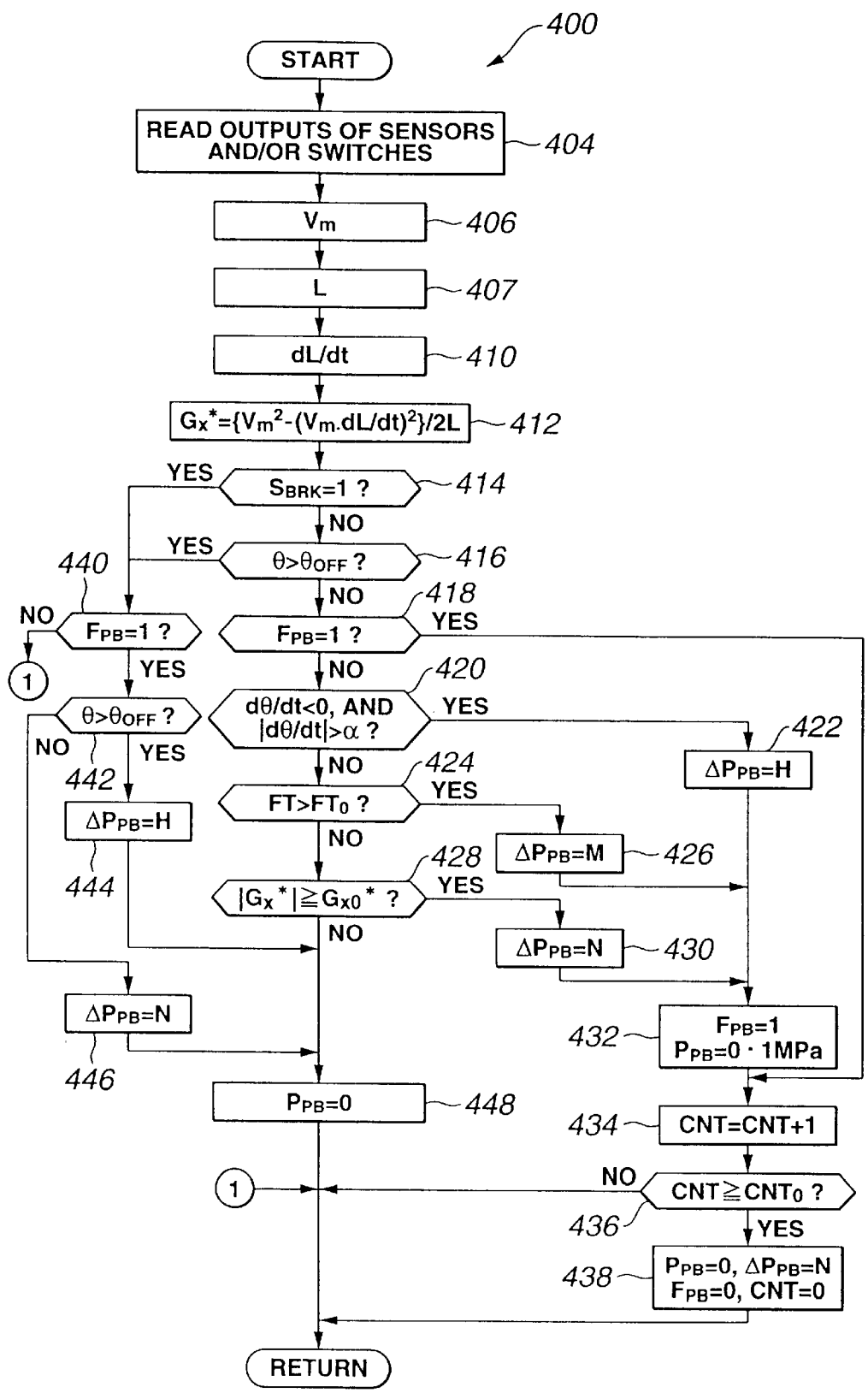
FIG. 6 is a flowchart illustrating a series of microprocessor operations of a control routine for carrying out one preferred embodiment of the present invention.

Referring to FIG. 6, the processing sequence before operator depressing the brake pedal under a condition of approaching or following an obstacle preceding the vehicle will be considered. A series of microprocessor operations are stored in computer readable storage medium 104 (see FIG. 3) in the form of sequences of instructions implemented in software for determining occurrence of recognition of emergency or occurrence of operator reaction or quick release of accelerator pedal to initiate a stand-by brake torque control, a build-up or variation rate $\Delta P_{PB}$, with respect to time, at which brake pressure increases till completion of pressure build-up for stand-by brake torque.

FIG. 6 illustrates a series of operations for carrying out the first preferred embodiment of the present invention. The process steps of FIG. 6 are periodically executed in brake controller 46 when stand-by brake torque control mode is selected by SMMB switch 136 (see FIG. 3) after the ignition has been turned on and electric power has been applied to controller 46.

In FIG. 6, a control routine is generally indicated at 400. The process steps of control routine 400 are carried out every ΔT (for example, 10 milliseconds) in controller 46 as provided through a standard computer timer-based interrupt process.

Each sequential execution of the microprocessor operations of FIG. 6 begins at start block and proceeds to process block 404.

At block 404, the processor reads in outputs of sensors and/or switches. The routine goes to block 406 and then to block 408. At block 406, the processor receives information as to travelling speed Vm of the vehicle from various outputs read at block 404. At block 408, the processor receives information as to a distance L to the preceding obstacle. The routine goes from block 408 to block 410. At block 410, the processor determines the time differential dL/dt of the distance L. Then, the routine goes to block 412. At block 412, the processor calculates a target value of deceleration Gx* which can be expressed as:

$$Gx^* = \{Vm^2 - (Vm - dL/dt)^2\}/2L \quad (1).$$

At the next block 414, the processor determines whether or not a brake switch signal $S_{BRK}$ from brake switch 132 is equal to 1 so that brake switch 132 is at "ON" level in response to depression of brake pedal 48. If, at block 414, brake switch 132 is at "ON" level and thus brake switch signal $S_{BRK}$ is equal to 1 (yes), the routine goes to block 440. If not (no), the routine goes to block 416. At block 416, the processor determines whether or not accelerator angle θ from AC sensor 134 is greater than a predetermined value $\theta_{OFF}$ near the fully closed angle. If, at block 416, accelerator angle θ is greater than the predetermined value $\theta_{OFF}$ (yes), the routine goes to block 440. If not (no), the routine goes to block 418.

At block 418, the processor determines whether or not a stand-by brake torque control flag $F_{PB}$ is set equal to 1. If flag $F_{PB}$ is set equal to 1 (yes), the routine goes to block 434. If not (no), the routine goes to block 420

At block 420, the processor calculates time differential d θ/dt of accelerator angle & and determines whether or not d θ/dt is less than 0 (zero) and its absolute value exceeds a predetermined value of α (where: α>0). If, at block 420, d θ/dt<0, and I d θ/dt I>α(yes), the routine goes to block 422. If not (no), the routine goes to block 424.

At block 422, the variation rate $\Delta P_{PB}$ is set equal to H (where: H represents an increment for highest-level of emergency). Then, the routine goes to block 432. This is the situation where the operator releases accelerator pedal 50 quickly to cope with external conditions so that there is short time left before operator depresses brake pedal 48. This time is shorter than time left before operator depresses brake pedal 48 in the case where the routine goes from block 424 to block 426 or time left before operator depresses brake pedal 48 in the case where routine goes from block 428 to block 430.

At block 424, the processor determines whether or not footrest pressure signal FT from footrest pressure sensor 133 exceeds a predetermined value $FT_0$ (where: $FT_0>0$). If, at block 424, FT>$FT_0$, the routine goes to block 426. If not, the routine goes to block 428.

At block 426, the variation rate $\Delta P_{PB}$ is set equal to M (where: M represents an increment for middle-level emergency. The routine next goes to block 432. Let us consider the situation where the routine goes from block 424 to block 426 as compared to the situation where the routine goes from block 420 to block 422. The determination at block 424 that FT>$FT_0$ indicates a situation where operator has reacted to some external conditions. Such operator reaction occurs before the operator releases accelerator pedal 50 and can be detected at early timing before detection at block 420 that the operator has quickly released accelerator pedal 50. Thus, there is slightly more time left before operator depresses brake pedal 48 than the time left before operator depresses brake pedal 48 in the case where the routine goes from block 420 to block 422. Accordingly, the variation rate $\Delta P_{PB}$ is set equal to M for middle-level emergency, which is less than H for highest-level emergency but greater than N for normal-level emergency. As a result, ride feel objectionable to operator is suppressed without impairing effectiveness of stand-by brake operation. The routine goes from block 424 to block 428 if operator reaction is not detected.

At block 428, the processor determines whether or not the absolute value of target value Gx* of deceleration is greater than a predetermined value $Gx_0^*$. If the absolute value of target value $Gx^*$ of deceleration is greater than or equal to the predetermined value of $Gx_0^*$(yes), the routine goes to block 430. If not (no), the routine goes to block 448.

At block 430, the variation rate $\Delta P_{PB}$ is set equal to N for normal-level emergency. The routine next goes to block 432. Let us consider the situation where the routine goes from block 428 to block 430 as compared to the situation where the routine goes from block 420 to block 422. There is more time left before operator depresses brake pedal 48 than the time left before operator depresses brake pedal 48 in the case where the routine goes from block 420 to block 422. Accordingly, the variation rate $\Delta P_{PB}$ is set equal to N for normal-level emergency, suppressing ride feel objectionable to operator as well as ensuring effectiveness of stand-by brake operation. The routine goes from block 430 to block 432.

At block 432, stand-by brake torque control flag $F_{PB}$ is set equal to 1, and the target value $P_{PB}$ is set equal to a predetermined value. Setting is such that supplying friction brakes with brake pressure as high as the predetermined value maintains enhanced response of the friction brakes when operator depresses brake pedal 48 without any vehicle deceleration objectionable to the operator. In this embodiment, the predetermined value is 0.1 MPa so that the vehicle deceleration is negligibly small. If desired to put emphasis on braking, the predetermined value higher than 0.1 MPa may be used to cause some vehicle deceleration before operator depresses brake pedal 48. The routine goes from block 432 to block 434. At block 434, the processor makes increment of stand-by brake control counter CNT.

At the next block 436, the processor determines whether or not counter CNT is greater than or equal to a predetermined value $CNT_0$. If counter CNT is greater than or equal to the predetermined value $CNT_0$ (yes), the routine goes to block 438. If not (no), the routine returns. The predetermined value $CNT_0$ is so chosen as to give time sufficiently long enough to cover any available time left before operator depresses brake pedal 48 in response to the determination at block 420 or 424 or 428 that stand-by brake torque build-up is needed in anticipation of vehicle operator braking action. In this embodiment, the time to be given is 1 second and thus the predetermined value $CNT_0$ is 100 taking into account that the cycle time is 10 milliseconds. If, within this time, it happens that operator does not depress brake pedal 48, the processor determines that the anticipation that operator braking action is imminent has failed.

If, at block 436, the counter CNT becomes equal to or greater than the predetermined value $CNT_0$, the routine goes to block 438. At block 438, the processor sets target value $P_{PB}$ equal to 0, sets variation rate $\Delta P_{PB}$ equal to N for normal-level emergency, resets flag $F_{PB}$ equal to 0 (zero). Then, the routine returns, and resets counter CNT equal to 0 (zero).

With reference to blocks 414, 416 and 440, if the result of inquiry made at block 414 or 416 is affirmative (yes), the routine goes to block 440. At block 440, the processor determines whether or not flag $F_{PB}$ is set to 1. If this is the case, the routine goes to block 442. If not, the routine returns.

At block 442, the processor determines whether or not accelerator angle θ exceeds the predetermined value $\theta_{OFF}$. If θ exceeds $\theta_{OFF}$, the routine goes to block 444. If not, the routine goes to block 446.

At block 444, the variation rate $\Delta P_{PB}$ is set equal to H for highest-level. At block 446, the variation rate $\Delta P_{PB}$ is set equal to N for normal-level. The routine goes from block 444 or 446 to block 448. In the case where operator manipulates brake pedal 48 or accelerator pedal 50, the stand-by brake torque is no longer necessary. Thus, at block 448, the target value $P_{PB}$ is set equal to 0. When the accelerator pedal 50 is depressed, the brake pressure for stand-by brake torque drops quickly at the rate $\Delta P_{PB}$ =H determined at block 444, to meet operator acceleration demand. When the brake pedal 48 is depressed, the brake pressure for stand-by brake torque drops at the normal less quick rate $\Delta P_{PB}$ =N determined at block 446, to suppress any objectionable ride feel caused due to rapid drop in brake pressure during application of brakes.

After setting the target value $P_{PB}$, the routine returns.

With continuing reference to FIG. 6, the preferred embodiment will be further described.

After block 404, the target value $Gx^*$ of deceleration is determined at block 412. The routine goes to block 440 from block 414 or 416 if operator depresses brake pedal 48 or accelerator pedal 50. The routine returns from block 440 because stand-by brake torque control flag $F_{PB}$ is not yet set equal to 1.

If the brake pedal 48 and accelerator pedal 50 are not depressed, the routine goes from blocks 414 and 416 to block 418. At block 418, it is determined whether or not stand-by brake torque control is in progress by checking the status of the flag $F_{PB}$. If stand-by brake torque control is in progress, it is determined whether or not stand-by brake torque is needed, and the variation rate $\Delta P_{PB}$ is determined. The determination of the variation rate $\Delta P_{PB}$ is made at block 420 or 424 or 428. As explained in connection with blocks 420, 422, 424, 426, 428, and 430, the variation rate $\Delta P_{PB}$ is varied with differing periods of time left before operator depresses the brake pedal 48. In the embodiment, the variation rate $\Delta P_{PB}$ may take one of H (for highest-level), M (for middle-level), and N (for normal-level), where H>M>N.

a) If dθ/dt is less than 0 (zero) and the absolute value of dθ/dt is greater than the predetermined value α,
the variation rate $\Delta P_{PB}$ is set equal to H.

b) If the above condition a) does not hold, and FT exceeds the predetermined value $FT_0$,
the variation rate $\Delta P_{PB}$ is set equal to M.

c) If both of the above conditions a) and b) do not hold, and the absolute value of $Gx^*$ is greater than or equal to the predetermined value $Gx_0$,
the variation rate $\Delta P_{PB}$ is set equal to N.

In any one of the above three cases a), b), and c), the target value $\Delta P_{PB}$ is set at the predetermined value for the predetermined time (blocks 432, 434, and 436). At the variation rate $\Delta P_{PB}$ that is variable with differing periods of time left before operator depresses brake pedal 48, the brake pressure increases toward the target value $P_{PB}$, making it possible to complete build-up of brake pressure as high as the target value $P_{PB}$ before operator depresses brake pedal 48. If time left before operator depresses brake pedal 48 is relatively long, the variation rate $\Delta P_{PB}$ is set at N that is the smallest among the values H, M, and N. This proves to be effective in minimizing objectionable ride feel that might occur due to application of stand-by brake torque. Upon expiration of the predetermined time, if operation has not depressed brake pedal 48 and accelerator pedal 50, the variation rate $\Delta P_{PB}$ is set at N and the target value $P_{PB}$ is set at 0 (blocks 436 and 438). Thus, at the variation rate $\Delta P_{PB}$=N, the brake pressure decreases quietly toward zero. This pressure control is effective in minimizing objectionable ride feel that might occur due to rapid reduction of stand-by brake torque.

During the predetermined time when the stand-by brake torque control is in progress, if operator manipulates brake pedal 48 or accelerator pedal 50, the stand-by brake torque is no longer necessary. Thus, at block 448, the target value $P_{PB}$ is set equal to 0. When the accelerator pedal 50 is depressed, the brake pressure for stand-by brake torque drops quickly at the rate $\Delta P_{PB}=H$ determined at block 444, to meet operator acceleration demand. When the brake pedal 48 is depressed, the brake pressure for stand-by brake torque drops at the normal less quick rate $\Delta P_{PB}=N$ determined at block 446, to minimize any objectionable ride feel caused due to rapid reduction in stand-by brake torque.

Apparently from the preceding description, the distance (or relative distance) to the object preceding the vehicle may be detected using the output of obstacle detection system 30. The traveling speed of the vehicle may be detected using the output of vehicle speed sensor 138. Operator manipulates accelerator pedal 50 to express his or hear torque demand for vehicle acceleration. Thus, in the preferred embodiment, accelerator pedal 50 serves as means through which operator torque demand may be expressed. AC sensor 134 is provided to transmit the time rate of change in operator torque demand to controller 46. Footrest pressure sensor 133 is provided to detect operator reaction expressed in terms of pressure applied to footrest 49 and transmits signal FT indicative of the pressure to the controller 46. As explained in connection with blocks 420, 422, 424, 426, 428, and 430, controller evaluates emergency level and determines variation rate $\Delta P_{PB}$.

In the preferred embodiment, footrest pressure sensor 133 is used as an operator reaction sensor. This sensor 133 is only one example of various examples of sensors, which may be used as an operator reaction sensor. Some of such various examples are described in JP-A 11-286264 and include a grip sensor, a heart beat sensor, a muscle constriction sensor, and a sweat sensor. Another example is described in JP-A 10-24818, which describes a sensor to detect axial thrust imparted to sheering shaft. If one of these sensors is used instead of footrest pressure sensor 133, the routine goes from block 424 to block 426 if the magnitude of the sensor output exceeds a predetermined value. Instead of the footrest pressure sensor 133, a seat load sensor may be used. In this case, the peak of variations of detected load over a predetermined period of time, for example, 1 second, is compared at block 424 with a predetermined value. The routine goes from block 424 to block 426 if the detected peak exceeds the predetermined value.

Figure 7:
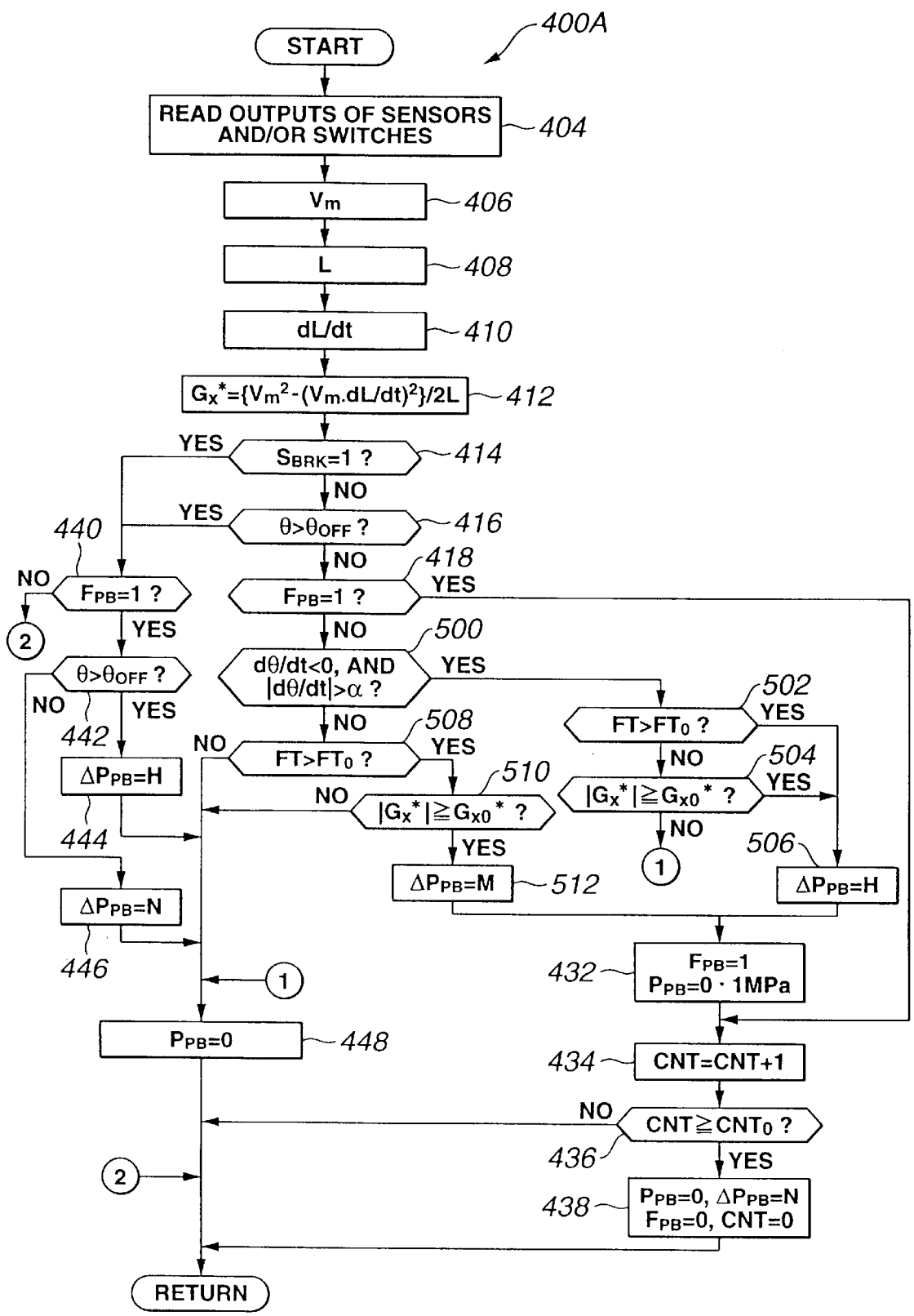
FIG. 7 is a flowchart illustrating a series of microprocessor operations of a control routine for carrying out another preferred embodiment of the present invention.

Referring to FIG. 7, the second preferred embodiment is described. The second embodiment is substantially the same as the first embodiment in hardware.

FIG. 7 illustrates a series of operations for carrying out the second preferred embodiment of the present invention. In FIG. 7, a control routine is generally indicated at 400A.

Control routine 400A is substantially the same as control routine 400 except logic to emergency level in determining variation rate $\Delta P_{PB}$ at which brake pressure increases upon build-up of stand-by brake torque. Specifically, new blocks 500, 502, 504, 506, 508, 510, and 512 (see FIG. 7) have replaced the blocks 420, 422, 424, 426, 428, and 430 (see FIG. 6).

With reference to FIG. 7, the modified portion only is described.

At block 418, processor determines whether or not flag $F_{PB}$ is set. If this is the case, the routine goes to block 434. If not, the routine goes to block 500.

At block 500, the processor calculates time differential $d\theta/dt$ of accelerator angle $\theta$ and determines whether or not $d\theta/dt$ is less than 0 (zero) and its absolute value exceeds a predetermined value of $\alpha$ (where: $\alpha>0$). If, at block 500, $d\theta/dt<0$, and $|d\theta/dt|>\alpha$ (yes), the routine goes to block 502. If not (no), the routine goes to block 508.

At block 502, the processor determines whether or not footrest pressure signal FT from footrest pressure sensor 133 exceeds a predetermined value $FT_0$ (where: $FT_0>0$). If, at block 502, $FT>FT_0$, the routine goes to block 506. If not, the routine goes to block 504.

At block 504, the processor determines whether or not the absolute value of target value $Gx^*$ of deceleration is greater than a predetermined value $GX_0^*$. If the absolute value of target value $Gx^*$ of deceleration is greater than or equal to the predetermined value of $Gx_0^*$ (yes), the routine goes to block 506. If not (no), the routine goes to block 448.

At block 506, the variation rate $\Delta P_{PB}$ is set equal to H (where: H represents an increment for highest-level of emergency). Then, the routine goes to block 432.

At block 508, the processor determines whether or not footrest pressure signal FT from footrest pressure sensor 133 exceeds a predetermined value $FT_0$ (where: $FT_0>0$). If, at block 508, $FT>FT_0$, the routine goes to block 510. If not, the routine goes to block 448.

At block 510, the processor determines whether or not the absolute value of target value $Gx^*$ of deceleration is greater than a predetermined value $Gx_0^*$. If the absolute value of target value $Gx^*$ of deceleration is greater than or equal to the predetermined value of $Gx_0^*$ (yes), the routine goes to block 512. If not (no), the routine goes to block 448.

At block 512, the variation rate $\Delta P_{PB}$ is set equal to M (where: M represents an increment for middle-level emergency). The routine next goes to block 432.

As explained in connection with blocks 500, 502, 504, 506, 508, 510, and 512, the variation rate $\Delta P_{PB}$ is varied with differing periods of time left before operator depresses the brake pedal 48. In this embodiment, the variation rate $\Delta P_{PB}$ may take one of H (for highest-level), and M (for middle-level), where H>M.

a) If $d\theta/dt$ is less than 0 (zero) and the absolute value of $d\theta/dt$ is greater than the predetermined value $\alpha$,
the variation rate $\Delta P_{PB}$ is set equal to H if FT exceeds the predetermined value $FT_0$ or if the absolute value of $Gx^*$ is greater than or equal to the predetermined value $Gx_0^*$.

b) If the above condition a) does not hold,
the variation rate $\Delta P_{PB}$ is set equal to M, if FT exceeds the predetermined value $FT_0$ or if the absolute value of $Gx^*$ is greater than or equal to the predetermined value $Gx_0^*$.

It will now be appreciated to those skilled in the art that stand-by brake torque control begins with recognition of emergency at block 428 (see FIG. 6) or occurrence of operator reaction at block 424 (see FIG. 6) or quick release of accelerator at block 420 (see FIG. 6) for initiating pressure build-up for stand-by brake torque before vehicle operator depresses the brake pedal.

It will also be appreciated that, at the initiation of the stand-by brake torque control, the variation rate $\Delta P_{PB}$ is set at the value H (at block 422) or M (at block 426) or N (at block 430), and the stand-by brake torque control flag $F_{PB}$ is set and the target value $P_{PB}$ is set at 0.1 MPa (block 432).

It will be further appreciated that the stand-by brake torque control continues as long as the control flag $F_{PB}$ is set, but the control flag $F_{PB}$ is reset upon expiration of the predetermined period of time (blocks 436 and 438), for example, 1 second in the embodiments, so that the stand-by brake torque control continues upon expiration of the predetermined period of time unless vehicle operator operates the brake pedal or accelerator pedal.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-001932, filed Jan. 9, 2001, the disclosure of which is hereby incorporated by reference in its entirety.

What is claimed is:

1. A system for stand-by brake torque control wherein brake pressure increases till completion of pressure build-up for stand-by take torque applied to an automotive vehicle under a condition of approaching or following an obstacle preceding the vehicle, the system comprising:
   an obstacle recognition system detecting a distance to the obstacle preceding the vehicle;
   a vehicle speed sensor detecting traveling speed of the vehicle;
   an accelerator operable by an operator of the vehicle;
   an accelerator sensor detecting operator demand for vehicle acceleration from motion of the accelerator;
   an operator reaction responsive sensor detecting reaction by the operator; and
   a controller programmed;
   to perform stand-by brake torque control before operator action for braking,
   to select one of predetermined different emergency levels in response to at least one of the detected distance the detected traveling speed, the detected operator demand, and the detected reaction, and
   to determine one of various variation rates in response to the selected one emergency level for initiating the stand-by brake torque control by increasing brake pressure at the determined one variation rate till completion of pressure build-up for stand-by brake torque applied to the vehicle.

2. The system as claimed in claim 1, wherein the predetermined different emergency levels include a highest-level emergency, and wherein the controller selects the highest-level emergency when the time differential of the detected operator demand is less than zero and the absolute value of the time differential of the detected operator demand is greater than a predetermined value.

3. The system as claimed in claim 2, wherein the predetermined different emergency levels include a second-level emergency that is lower than the highest-level emergency, and wherein the controller selects the second-level emergency in the absence of selection of the highest-level emergency.

4. The system as claimed in claim 2, wherein the various variation rates include a first variation rate and a second variation rate, and the first variation rate is greater than the second variation rate, and wherein the controller determines the first variation rate in response to the selection of the highest-level emergency.

5. The system as claimed in claim 3, wherein the various variation rates include a first variation rate, a second variation rate, and a third variation rate, wherein the first variation rate is greater than the second variation rate and the second variation rate greater than the third variation rate, and wherein the controller determines the second variation rate in response to the selection of the second-level emergency.

6. The system as claimed in claim 1, wherein the controller is programmed to determine an increased variation rate for terminating the stand-by brake torque control by decreasing brake pressure at the determined increased variation rate from the build-up pressure for stand-by brake torque when the time differential of the detected operator demand is greater than zero.

7. A method for stand-by brake torque control wherein brake pressure increases till completion of pressure build-up for stand-by brake torque applied to an automotive vehicle under a condition of approaching or following an obstacle preceding the vehicle, the vehicle having an accelerator and a brake pedal, the method comprising:
   initiating stand-by brake torque control upon determination of one of events that include recognition of emergency, operator reaction, and quick release of the accelerator;
   determining a variation rate at which brake pressure increases till completion of pressure build-up for stand-by brake torque applied to the vehicle in response to time left before the vehicle operator depresses the brake pedal after determining the one event; and
   increasing brake pressure at the determined variation rate till completion of pressure build-up for stand-by brake torque before the vehicle operator depresses the brake pedal.

8. The method as claimed in claim 7, wherein the recognition of emergency occurs when the absolute value of a target value of deceleration, which is determined from a detected distance to the preceding obstacle and a detected traveling speed of the vehicle, exceeds a predetermined value.

9. The method as claimed in claim 7, wherein a sensor is provided to detect a parameter indicative of operator state and the operator reaction is determined when the detected parameter exceeds a predetermined value.

10. The method as claimed in claim 7, wherein a sensor is provided to detect a parameter indicative of the accelerator, and the quick release of accelerator is determined when the detected parameter exceeds a predetermined value.

11. A system for stand-by brake torque control wherein brake pressure increases till completion of pressure build-up for stand-by brake torque applied to an automotive vehicle under a condition of approaching or following an obstacle preceding the vehicle, the vehicle having an accelerator and a brake pedal, the system comprising:
   means for initiating stand-by brake torque control upon determination of one of events that include recognition of emergency, operator reaction, and quick release of the accelerator;
   means for determining a variation rate at which brake pressure increases till completion of pressure build-up for stand-by brake torque applied to the vehicle in response to time left before the vehicle operator depresses the brake pedal after determining the one event; and
   means for increasing brake pressure at the determined variation rate till completion of pressure build-up for stand-by brake torque before the vehicle operator depresses the brake pedal.

* * * * *